United States Patent Office 2,829,946
Patented Apr. 8, 1958

2,829,946
PREPARATION OF LITHIUM BOROHYDRIDE

George L. Cunningham, Cleveland, Ohio, and John M. Bryant and Emily M. Gause, San Antonio, Tex., assignors to Callery Chemical Company, Pittsburgh, Pa., a corporation of Pennsylvania No Drawing. Application December 1, 1954
Serial No. 472,533

4 Claims. (Cl. 23—14)

This invention relates to a process for converting sodium borohydride into lithium borohydride. More particularly, it relates to a process whereby sodium borohydride is reacted with anhydrous lithium chloride in N,N-dimethylformamide to produce lithium borohydride and sodium chloride.

Lithium borohydride has been prepared by several methods one of which is the reaction of lithium hydride with diborane or trimethyl borate. Schlesinger et al., (75 J. A. C. S. 209) used in the reaction of sodium borohydride with anhydrous lithium chloride in isopropylamine. They also stated that methylamine or ethylamine could be used as solvents. This latter method which should be the most advantageous economically has been studied extensively. At present the method requires an ether extraction of the reaction products to remove excess lithium chloride. Large volumes of solvent must be handled and evaporated and represent a distinct objection to the method. A solvent is needed in which sodium chloride is insoluble, lithium chloride and sodium borohydride soluble enough to react and lithium borohydride very soluble.

It is an object of this invention to provide a suitable solvent which will meet the requirements enumerated above. Another object is to provide a process for preparing lithium borohydride by direct metathesis which is simple and economical to carry out. A further object is to provide a process for preparing lithium borohydride from sodium borohydride and lithium chloride in a solvent which avoids the objections of the above-mentioned methods of preparation. Other objects will become apparent as hereinafter described.

This invention is based upon our discovery that lithium borohydride may be prepared metathetically from sodium borohydride and lithium chloride in N,N-dimethylformamide. We have found that lithium borohydride, sodium borohydride and lithium chloride are relatively soluble in N,N-dimethylformamide while sodium chloride is very insoluble. At 25° C. these salts have the following solubilities in this solvent as determined experimentally by us.

| Salt | Solubility (g./salt per 100 g. solvent) |
|---|---|
| LiCl | 11.04 |
| NaBH$_4$ | 25.495 |
| LiBH$_4$ | 3.50 |
| NaCl | 0.05 |

We have likewise discovered that if a solution of sodium borohydride in N,N-dimethylformamide is added to a solution of lithium chloride in N,N-dimethylformamide a reaction will occur and sodium chloride will be precipitated. The sodium chloride can be removed from the slurry by filtration or other suitable means. The mother liquor or filtrate contains substantially pure lithium borohydride. Because of the low solubility of sodium chloride in this solution about 99% of the chloride ions present in the original slurry are precipitated as sodium chloride. The mother liquor contains about 97% lithium borohydride on a dry basis. It is not necessary but preferable to add the two reacting salts in exactly equivalent amounts so that the resulting mother liquor will contain pure lithium borohydride. If an excess of either reactant is used to prepare the original slurry, the mother liquor will contain this excess which contaminates the desired product.

Since the solubility system comes to equilibrium quite rapidly when solutions of the two reactants are used to prepare the original slurry, this method is preferred. However, the solid salts may be added to the solvent if desired and the system will still come to equilibrium within a reasonable time. There is no tendency for the precipitated sodium chloride to stick to the reacting salts and thus mask the reaction.

Sodium borohydride and lithium borohydride are quite sensitive to the presence of water and if water is present even in trace amounts the borohydride ion will decompose with the evolution of hydrogen gas. It is therefore necessary to use anhydrous salts and anhydrous solvent to prepare the slurry. When these precautions are observed only a small amount of hydrogen gas is evolved.

In one experiment embodying this invention, 18.9 g. of anhydrous sodium borohydride and 21.2 g. of anhydrous lithium chloride were added to 300 g. of anhydrous N,N-dimethylformamide. The slurry was stirred at 25° C., for four hours and filtered to remove 27.4 g. of sodium chloride. Approximately 94% of the chloride ions were precipitated as sodium chloride. The mother liquor was vacuum evaporated at room temperature and finally at 100° C. to give a solid partially solvated product containing about 50 mol percent lithium borohydride. Removal of all the solvent is difficult.

Having thus described our invention fully and completely as required by the patent laws, it should be understood that this invention may be practiced otherwise than as specifically described.

What we desire to particularly point out and distinctly claim is:

1. A method of preparing lithium borohydride which comprises reacting anhydrous sodium borohydride with anhydrous lithium chloride in anhydrous N,N-dimethylformamide, removing the precipitated sodium chloride and evaporating the solvent to recover the solid lithium borohydride formed.

2. A method according to claim 1 in which the sodium borohydride and lithium chloride are reacted in stoichiometric proportions.

3. A method according to claim 1 in which the solvent is removed from the lithium borohydride by vacuum evaporation within the temperature range of 25° to 100° C.

4. A method according to claim 1 in which the reaction is carried out at about 25° C.

References Cited in the file of this patent

UNITED STATES PATENTS

| | | |
|---|---|---|
| 2,726,926 | Paul et al. | Dec. 13, 1955 |
| 2,741,540 | Bragdon et al. | Apr. 10, 1956 |

FOREIGN PATENTS

| | | |
|---|---|---|
| 1,046,081 | France | July 8, 1953 |

OTHER REFERENCES

Comey and Hahn: "Dictionary of Chemical Solubilities, Inorganic," p. 850, 2nd ed. (1921), MacMillan Co., N. Y. C.

Metal Hydrides, Inc., Bulletin 502A on $NaBH_4$, 2 pp., sec'd in Patent Office, February 15, 1950.

Schlesinger et al.: "J. A. C. S.," vol. 75, p. 203, January 5, 1953.

Nature, vol. 173, No. 4394, pp. 125-6, January 16, 1954.